Dec. 16, 1941.   L. COES, JR   2,266,004
PROCESS FOR PARTIALLY HYDROLYZING ACRYLATE ESTERS
Filed April 18, 1939
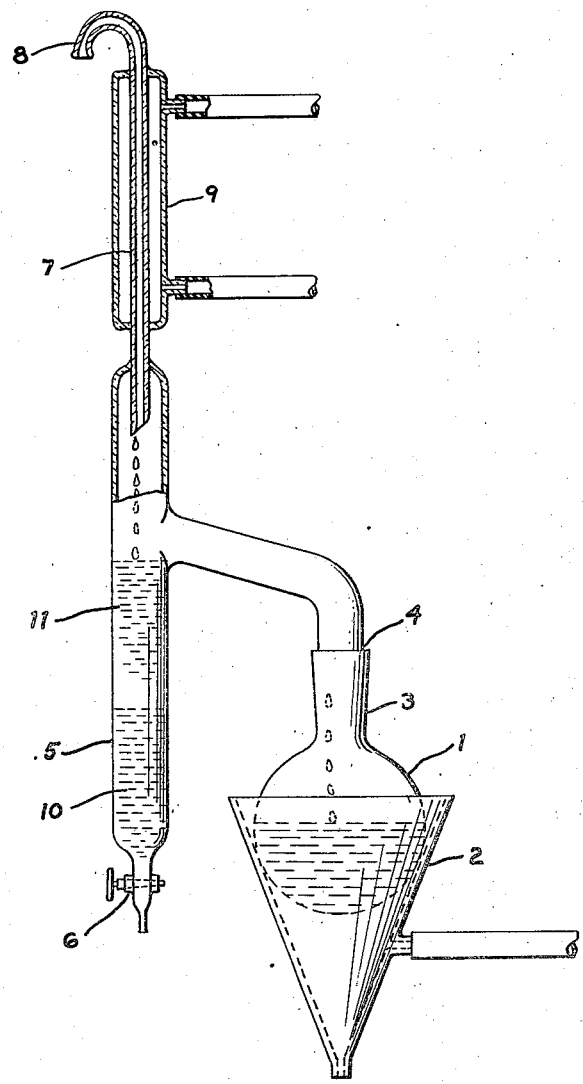
Inventor
LORING COES JR.
By George Crompton
Attorney Patented Dec. 16, 1941

2,266,004

UNITED STATES PATENT OFFICE 2,266,004

PROCESS FOR PARTIALLY HYDROLYZING ACRYLATE ESTERS

Loring Coes, Jr., Brookfield, Mass., assignor, by mesne assignments, to E. I. du Pont de Nemours & Company, Wilmington, Del., a corporation of Delaware Application April 18, 1939, Serial No. 268,543

8 Claims. (Cl. 260—486)

The invention relates to processes for the production of acrylic interpolymers and by that I intend to include various esters of acrylic acid and such alpha substituted acrylic acids as will polymerize.

One object of the invention is to provide a practical process for commercial production of the interpolymer of methyl methacrylate and methacrylic acid. Another object of the invention is to provide a facile process for the manufacture of optical bodies, such as eye glass lenses. Another object of the invention is to simplify the hardening of such polymers as methyl methacrylate and its homologues including esters of acrylic and methyl acrylic acid with monohydric alcohols. Another object of the invention is to provide a practical commercial process for the production of monomeric substances to make the polymers indicated which is capable of producing such a pure monomer that the polymer will be very clear and colorless. Another object of the invention is to speed up the production of the interpolymer of monomeric methyl methacrylate and methacrylic acid. Other objects will be in part obvious or in part pointed out hereinafter.

The invention accordingly consists in the combinations of elements and in the several steps and relation and order of each of said steps to one or more of the others thereof, all as will be illustratively described herein, and the scope of the application of which will be indicated in the following claims.

The accompanying single figure of the drawing is illustrative of apparatus for carrying out one step of the process.

I provide or procure a quantity of methyl methacrylate monomer. Methyl methacrylate is written $CH_2=C(CH_3)COOCH_3$. However, the process is equally applicable to any of the lower alkyl esters of methacrylic acid, e. g. ethyl, propyl and isopropyl esters, and is also applicable to the same esters of acrylic acid. The invention will be described in connection with the processing of methyl methacrylate because that gives the preferred product, namely methyl methacrylate and methacrylic acid, which monomeric mixture readily polymerizes to a transparent and colorless compound that is moldable and also sufficiently hard to be grindable. The reason for desiring to add some methacrylic acid to methyl methacrylate is that the latter when polymerized alone is relatively soft and not scratch resistant. In the interpolymer of methyl methacrylate with methacrylic acid, the carboxyl groups are believed to attract each other, thus forming a weak bond between the linear chains which makes the ultimate polymer harder than the unmodified polymer of methyl methacrylate. The interpolymer also softens at a higher temperature than polymethyl methacrylate and this is likewise an advantage for many uses.

I will now describe the processing of some monomeric methyl methacrylate to make first a monomeric mixture of methyl methacrylate containing 15% methacrylic acid and then the polymerization of this monomeric liquid mixture to make a solid interpolymer of methyl methacrylate with 15% methacrylic acid.

Taking ten liters of the methyl methacrylate monomer, I place it in a twenty liter glass flask fitted with a mechanical stirrer and which is equipped with some means for cooling. Three thousand five hundred cubic centimeters of a solution of sodium hydroxide made by dissolving fourteen hundred and forty grams of sodium hydroxide in six liters of water is then added. The sodium hydroxide should be free from impurities which would tend to cause color in the final product; the "analytical reagent" grade of commerce is satisfactory. The mixture is then rapidly stirred so that the sodium hydroxide solution becomes suspended in the methyl methacrylate in fine droplets. After fifteen or twenty minutes the reaction starts and the temperature rises rapidly to 40–45° C. I allow the reaction to continue until the liquid in the flask is no longer alkaline to phenolphthalein. This takes about half an hour. The mixture is then cooled to 20° C. I then add three thousand one hundred cubic centimeters of sulphuric acid solution made by adding one liter of "reagent" grade concentrated sulphuric acid to five liters of water. The acid should be added slowly with constant stirring to prevent the formation of colored substances, and the stirring should be continued for about five minutes after the addition of the acid is completed.

The addition of the caustic soda to the methyl methacrylate causes the following reaction, but part only of the methyl methacrylate takes part in the reaction:

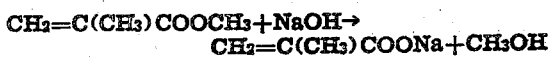

The addition of the sulphuric acid causes the following reaction with the sodium methacrylate:

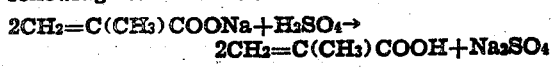

The flask now contains eight and a half liters of methyl methacrylate monomer and the balance if one and a half liters is mostly methacrylic acid with some water, some sodium sulfate, and some methyl alcohol. There may be a trace of sodium methacrylate because I prefer to keep the reaction slightly on the alkaline side, but using the amounts given there is no more than a trace.

After stirring for five minutes as aforesaid, most of the water which forms a lower layer is drawn off. I now add one liter of distilled water and shake the mixture thoroughly. This is for the purpose of removing the remaining traces of water soluble salts and methyl alcohol. The mixture is then allowed to settle for a few minutes and the water is again drawn off. This purifies the mixture and it now contains substantially only methyl methacrylate, methacrylic acid and a small amount of water.

I now add a suitable drying agent, for example one kilogram of anhydrous sodium sulfate, and allow the mixture to stand overnight. The sodium sulfate settles to the bottom and has removed some of the remaining water.

The amounts of the starting ingredients are calculated to produce a slight excess of the acid over the 15% thereof desired and, therefore, at this point I calculate the percentage of acid, which may be done by titration with standard sodium hydroxide. I then add enough monomeric methyl methacrylate to reduce the amount of acid to 15%. However, the mixture still contains of the order of two and a half to three per cent of water which I now proceed to remove.

Referring now to the accompanying drawing, I place the mixture in a flask 1 which is to be heated with a steam cone 2. The neck 3 of the flask 1 is connected by a ground glass joint 4 to a water separator 5 having a stop cock 6 for drawing off the water. The top of the water separator 5 is sealed to a condenser tube 7, the top 8 of which is connected to a vacuum pump and around which water is circulated through a jacket 9.

Water and methyl methacrylate form a constant boiling or azeotropic mixture consisting of 75% methyl methacrylate and 25% water boiling at 75° C. at 760 millimeters of mercury. Insomuch as methyl methacrylate and water each boil at 100° C. at that pressure, the 75% methyl methacrylate, 25% water mixture goes over first.

I operate the apparatus at a pressure of around one hundred and fifty millimeters of mercury and the distillate condenses in the condenser tube 7 and drops back into the water separator 5. Water 10 rapidly collects at the bottom of the separator 5. The supernatant methyl methacrylate flows back into the flask 1. The volume of the left-hand leg of the water separator 5 is calculated so that substantially all of the condensed methyl methacrylate 11 will go back into the flask 1 and at the end of a run, the left-hand leg will be almost full of water. The methacrylic acid does not go over because this boils at a much higher temperature, namely around 158° C. The water separator apparatus operated as described removes all the water from the mixture, at least it has been impossible to find even a trace of it left.

The liquid in the flask 1 is now 85% methyl methacrylate and 15% methacrylic acid and is no longer entirely monomeric. It has polymerized so that it is a somewhat viscous liquid having about the viscosity of molasses at room temperature.

The liquid can now be poured into suitable molds and when heated at a temperature of around 60° C. for a period of about twelve hours will form a solid interpolymer perfectly transparent and clear and substantially colorless. After a final heating to a temperature of 130° C. for a period of about eight hours, the interpolymer has a hardness greater than methyl methacrylate and is readily moldable under heat and pressure to form various useful optical bodies. It may also be ground, an operation which is difficult if not impossible with plain methyl methacrylate because of heat ridges which are formed during the grinding operation. This interpolymer of methyl methacrylate with methacrylic acid has a higher softening point than methyl methacrylate, for example the 15% acid interpolymer described softens at about 150° C.

In the manufacture of the interpolymer, useful bodies can be made using up to as much as about 20% of the acid, and since methyl methacrylate is itself a useful substance and is hardened by the addition of some acid, naturally one can add any lesser amount of the methacrylic acid down to zero. As examples of other esters with which the process of the invention may be carried out, I mention methyl acrylate and isopropyl methacrylate.

Caustic soda is the most practical base for the hydrolyzing of the ester as hereinbefore explained, but other hydroxides of alkaline metals may be used, for example potassium hydroxide. In the process it is important to have a strong base. Other acids besides sulphuric acid may be used in the second reaction, for example phosphoric acid, $H_3PO_4$. So far as I am aware, however, this has no advantage over sulphuric acid and it has the disadvantage that it is more expensive. While hydrochloric and nitric acids might be used, they are apt to cause discoloration of the final product because these acids appear to react with the methyl methacrylate.

For some purposes the amount of methacrylic acid might be increased to over twenty per cent but above that figure the product is usually opaque. However, the interpolymer of methyl methacrylate and methacrylic acid makes a good bond for abrasive grains to form grinding wheels and other abrasive bodies, in which event the transparency is of less moment. Other uses for the product besides the manufacture of optical bodies and grinding wheels may be found and my process is not to be deemed limited to any particular use of the product.

As an alternative method of removing the greater part of the water, I may lower the temperature of the mixture of monomeric methyl methacrylate and methacrylic acid to about twenty degrees below zero centigrade which freezes the water. This can then be filtered off. Methyl methacrylate freezes at around minus fifty degrees centigrade and although methacrylic acid freezes at around plus sixteen degrees centigrade, the solid is soluble in methyl methacrylate, so the methacrylic acid does not precipitate in any substantial amount even at minus twenty degrees centigrade. However, as in the case with the other embodiment of the invention, I follow this separation method with the distillation in the distillation apparatus, as already described.

While I have given certain theories about the polymerization and increase of hardness, the invention is not to be deemed limited thereto. It will thus be seen that there has been provided by this invention a process according to which the various objects hereinbefore set forth are successfully achieved. As many possible embodiments may be made of the art hereinbefore described without departing from the spirit of the invention, it is to be understood that all matter hereinbefore set forth or shown in the accompanying drawing is to be interpreted as illustrative and not in a limiting sense.

I claim:

1. Process of forming an excess of the acid in esters of the lower alkyl alcohols with acrylic acid and methacrylic acid which comprises completely hydrolyzing a substantial proportion of the ester by first adding an hydroxide of an alkali metal, then adding a strong mineral acid, then removing water and soluble salts.

2. Process according to claim 1 in which the water is eliminated by distilling an azeotropic mixture.

3. Process according to claim 1 in which the ester is methyl methacrylate.

4. Process of forming an excess of the acid in esters of the lower alkyl alcohols with acrylic acid and methacrylic acid which comprises completely hydrolyzing a substantial proportion of the ester by first adding an hydroxide of an alkali metal, then adding a strong mineral acid, then lowering the temperature to below zero centigrade, filtering out the ice, then distilling an azeotropic mixture to remove the remaining water.

5. Process of forming an excess of the acid in esters of the lower alkyl alcohols with acrylic acid and methacrylic acid which comprises completely hydrolyzing a substantial proportion of the ester by first adding an hydroxide of an alkali metal, then adding a strong mineral acid, then adding a suitable drying agent, then distilling an azeotropic mixture to remove the remaining water.

6. Process of removing water introduced in accordance with the process of claim 1 from a mixture of an acid selected from the group consisting of acrylic and methacrylic acid and an ester of a lower alkyl alcohol and an acid selected from the said group which comprises lowering the temperature to below zero centigrade and filtering the ice formed.

7. Process of removing water introduced in accordance with the process of claim 1 from a mixture of an acid selected from the group consisting of acrylic and methacrylic acid and an ester of a lower alkyl alcohol and an acid selected from the said group which comprises adding a drying agent, then removing the drying agent, then distilling an azeotropic mixture to remove the remaining water.

8. Process according to claim 1 followed by distillation of an azeotropic mixture to remove the remaining water.

LORING COES, JR.

CERTIFICATE OF CORRECTION.

Patent No. 2,266,004.  December 16, 1941.

LORING COES, JR.

It is hereby certified that error appears in the printed specification of the above numbered patent requiring correction as follows: Page 3, second column, line 27, claim 8, for the claim reference numeral "1" read --6--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.